United States Patent
Singh et al.

(10) Patent No.: US 12,323,333 B2
(45) Date of Patent: Jun. 3, 2025

(54) SOFTWARE DISTRIBUTED, HARDWARE AGGREGATED HIERARCHICAL TRAFFIC MANAGEMENT

(71) Applicant: Intel Corporation, Santa Clara, CA (US)

(72) Inventors: Jasvinder Singh, Shannon (IE); Thomas Long, Limerick (IE); Eoin Walsh, Limerick (IE); John J. Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 992 days.

(21) Appl. No.: 16/953,210

(22) Filed: Nov. 19, 2020

(65) Prior Publication Data

US 2021/0075732 A1  Mar. 11, 2021

(51) Int. Cl.
*H04L 47/2425* (2022.01)
*H04L 47/60* (2022.01)
*H04L 47/62* (2022.01)
*H04L 47/6275* (2022.01)
*H04L 47/80* (2022.01)

(52) U.S. Cl.
CPC .......... *H04L 47/2425* (2013.01); *H04L 47/60* (2013.01); *H04L 47/6215* (2013.01); *H04L 47/6275* (2013.01); *H04L 47/808* (2013.01)

(58) Field of Classification Search
None
See application file for complete search history.

(56) References Cited

U.S. PATENT DOCUMENTS

| | | | |
|---|---|---|---|
| 8,027,354 B1* | 9/2011 | Portolani | H04L 49/70 370/395.2 |
| 2013/0039178 A1 | 2/2013 | Chen et al. | |
| 2014/0112128 A1* | 4/2014 | Kwan | H04L 47/30 370/230 |
| 2019/0007330 A1* | 1/2019 | Browne | H04L 47/522 |
| 2019/0199646 A1 | 6/2019 | Singh et al. | |
| 2020/0245192 A1* | 7/2020 | Roy | H04L 47/24 |

FOREIGN PATENT DOCUMENTS

EP    1187404 A2    3/2002

OTHER PUBLICATIONS

EPO Extended European Search Report in EP Application Serial No. 21198577.5 mailed on Mar. 18, 2022 (9 pages).

* cited by examiner

*Primary Examiner* — Jason E Mattis
*Assistant Examiner* — Bao G Nguyen
(74) *Attorney, Agent, or Firm* — Alliance IP, LLC

(57) ABSTRACT

In one embodiment, a system comprises an interface to receive a plurality of packets; and a plurality of processor units to execute a plurality of transmission sub-interfaces, each transmission sub-interface to perform hierarchical quality of service (HQoS) scheduling on a distinct subset of the plurality of packets, wherein each transmission sub-interface is to schedule its subset of the plurality of packets for transmission by a network interface controller by assigning the packets of the subset to a plurality of transmission queues that each correspond to a distinct traffic class.

19 Claims, 10 Drawing Sheets

SOFTWARE DISTRIBUTED, HARDWARE AGGREGATED HIERARCHICAL TRAFFIC MANAGEMENT

FIELD

The present disclosure relates in general to the field of computer development, and more specifically, to software distributed, hardware aggregated hierarchical traffic management.

BACKGROUND

A computer system may include at least one processor, associated memory modules, and one or more network interface controllers (NICs) providing communication with one or more networks. The computer system may receive packets via one or more NICs, process the packets, and transmit the packets through one or more NICs.

BRIEF DESCRIPTION OF THE DRAWINGS

Like reference numbers and designations in the various drawings indicate like elements.

DETAILED DESCRIPTION

Figure 1:
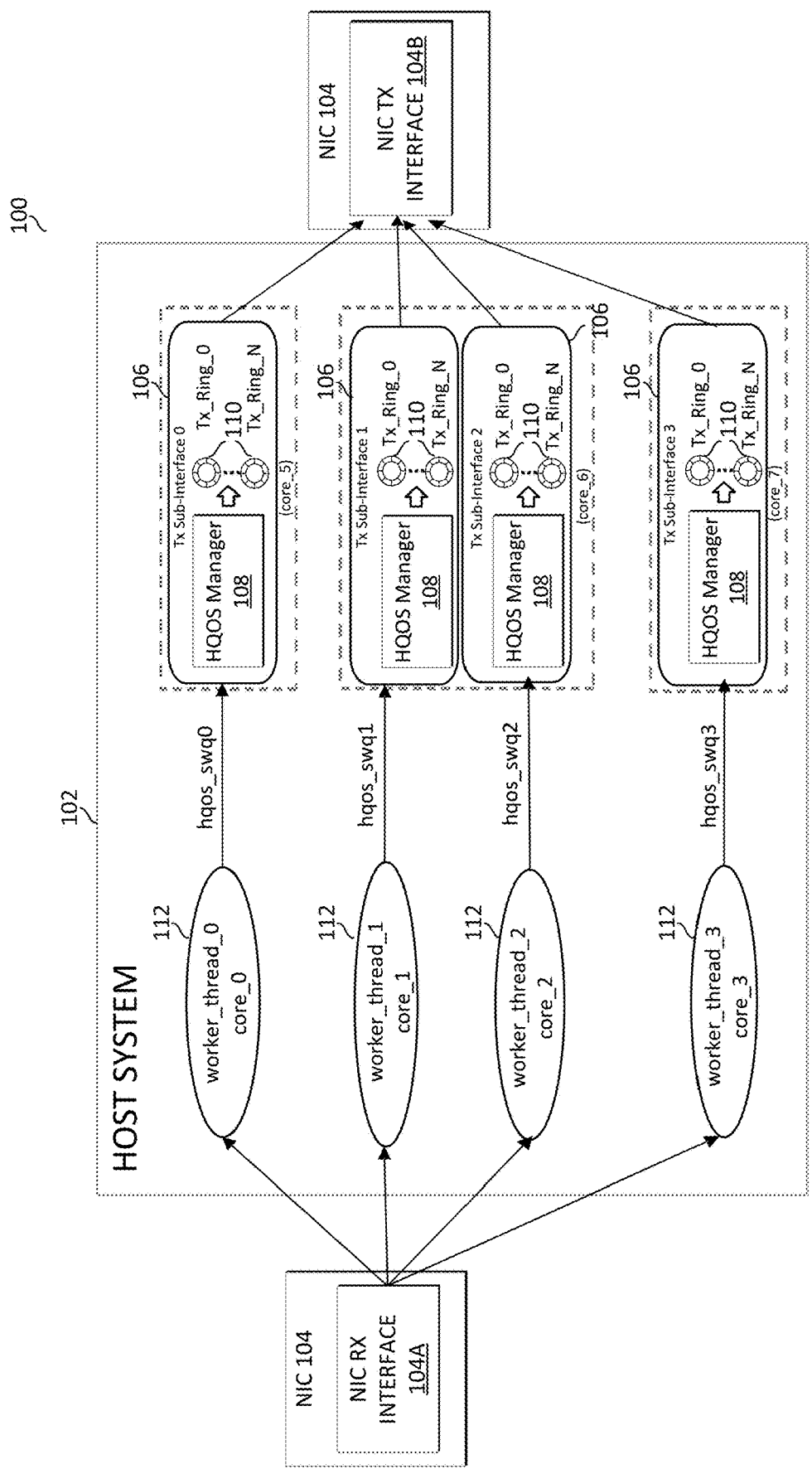
FIG. 1 illustrates a traffic management system in accordance with certain embodiments.

FIG. 1 illustrates a traffic management system 100 in accordance with certain embodiments. The system 100 comprises a host computing system 102 and a network interface controller (NIC) 104 comprising a receiver (RX) interface 104A and a transmitter (TX) interface 104B. In other embodiments, the RX interface 104A and the TX interface could be located on separate NICs.

Datacenter and network traffic may comprise a mix of several classes of traffic having different priorities (e.g., as described in Internet Engineering Task Force (IETF) RFC2475). For example, the traffic may include user-generated interactive traffic, traffic with deadlines (e.g., as defined by service-level agreements (SLAs)), and long-running traffic that imposes diverse quality of service (QoS) requirements in terms of latency, jitter, and packet loss. A hierarchical QoS scheduler may satisfy these varying traffic requirements by providing a high degree of granularity in traffic management by supporting multiple scheduling and shaping levels. This traffic management function may be implemented in hardware (e.g., NICs, network processing units (NPUs), or application specific integrated circuits (ASICs)) or software. Network interface sizes are expanding due to evolution in 4G/5G wireless, cable access, and broadband access networks. This is triggering the move to larger bandwidth connections to subscribers to accommodate this exponential growth in subscriber traffic. Such interfaces may be required to support a large number of subscribers.

Various embodiments of the present disclosure provide a scalable QoS traffic management solution for use with a high bandwidth NIC handling a large number of subscribers or flows. In one embodiment, the bandwidth of the NIC TX interface (e.g., 104B) is shared by multiple sub-interfaces 106 where each sub-interface implements a software instance of a hierarchical QoS traffic management solution (e.g., HQoS Manager 108) for a number of subscribers or flows. In an embodiment, each sub-interface 106 is assigned a guaranteed amount of bandwidth by the NIC 104, and may have an ability to burst above its guaranteed bandwidth if extra bandwidth is available. Each sub-interface 106 monitors packet transmission via output queues (e.g., tx_rings 110, where each tx_ring is mapped to a specific traffic class supported by the sub-interface 106). Based on this monitoring, a sub-interface 106 may adjust the allocated bandwidth profile (e.g., shaping and scheduling rates at the sub-interface and subscriber levels) to a level that is higher than guaranteed in case of low traffic situations on other sub-interfaces. In various embodiments, depending on the number of subscribers or flows, multiple sub-interfaces 106 may each be executed by individual CPU cores or may share a CPU core. Alternatively, some sub-interfaces 106 may share a core (e.g., core_6 in the embodiment depicted), while other sub-interfaces are executed by individual cores (e.g., core_5 and core_7). The different packets (which may be of different classes) scheduled from sub-interfaces are sent to the NIC TX interface 104B, which uses available resources to guarantee bandwidth to each traffic class of the aggregated traffic. Depending upon the requirement, any suitable QoS traffic management mechanism (for example, strict priority, round-robin, etc.) can be used to consolidate traffic from the sub-interfaces 106, redistribute the unused bandwidth among sub-interfaces, and transmit the packets out. The methods and systems described herein may be utilized in any suitable computing environment, including bare-metal and virtualized environments.

Some embodiments may utilize three phases of hierarchical QoS traffic management: software distributed hierarchical QoS traffic management, traffic aggregation and efficient utilization of bandwidth via distributing (by the NIC) unused bandwidth of an sub-interface to other sub-interfaces by the NIC, and distribution of guaranteed plus excess bandwidth (if any) available at sub-interfaces among the sub-interface subscribers.

Various embodiments may provide a QoS traffic management method that scales well on multicore CPUs (e.g., yielding near linear performance with an increase in CPU cores when needed to handle high traffic volume), supports a large number of subscribers on high-bandwidth interfaces, and provides dynamic reallocation of the interface bandwidth among subscribers of the sub-interfaces to efficiently utilize egress interface bandwidth. In some embodiments, multiple independent cloud ready/native applications (that may each have individual QoS requirements) share the same physical interface (e.g., 104B) while isolation among the applications is maintained.

Referring again to FIG. 1, packets from a plurality of subscribers enter the host system 102 via NIC RX interface 104A. The packets are then processed by worker threads 112, which execute on one or more of the CPU cores of the host system 102. In the embodiment depicted, each worker thread 112 executes on its own core, although other embodiments may have different arrangements. The packets may be split among worker threads 112 in any suitable manner. For example, the packets may be evenly split among the worker threads 112 or may be split based on characteristics of the packets (e.g., all packets from subscribers of a particular service provider may be processed by the same worker thread 112). In various embodiments, packets of a connection (where a connection may be defined as a series of packets between a subscriber and a destination node) are all processed by the same worker thread.

A worker thread 112 may perform any suitable processing on a packet, such as firewall related operations (e.g., determinations of whether the packet should be blocked), flow classification, metering (e.g., monitoring the volume of packets received), routing operations, packet modification (e.g., format translation, encapsulation, etc.), or other suitable operations.

During the processing, the worker thread 112 may generate data packet context information that may include parameters parsed from the data packet, metadata based off of such parameters, or other information associated with the data packet. In various embodiments, worker thread 112 may parse various packet context parameters from the packet. Typically, these parameters are included in one or more headers of the packet, but they may alternatively be located in a payload portion of the packet. Any suitable parameters may be parsed from the packet, such as a length of a packet (e.g., in bytes), a length of a packet header, one or more source addresses (e.g., Internet Protocol (IP) address, media access control (MAC) address, or other address), one or more destination addresses (e.g., IP address, MAC address, or other address), one or more protocol identifiers (e.g., UDP, TCP, IPv4, IPv6, or other protocol), one or more ports (e.g., Open Systems Interconnection (OSI) model layer 4 source and/or destination ports) associated with the packet, a VLAN identifier, a Virtual eXtensible Local Area Network (VXLAN) Network Identifier, one or more priorities of the packet (e.g., a quality of service (QoS) value) identifying a class of the traffic, a packet identifier (e.g., a unique identifier used during reassembly of fragmented datagrams), error information (e.g., a checksum of the header), or other suitable parameters of the packet.

After processing the packets, each worker thread 112 then provides the processed packets (and associated metadata in some implementations) to the associated sub-interface 106. The sub-interface 106 then performs HQoS traffic management via its HQoS manager 108 on packets from any number of subscribers and flows to organize the packets (or descriptors thereof) into tx_rings 110 for consumption by the NIC TX interface 104B.

The transmission bandwidth of the interface 104B is allocated among the sub-interfaces 106 by the NIC TX interface 104B. The division of the bandwidth among the sub-interfaces 106 may be based on any suitable factors, such as the respective number of subscribers handled by the sub-interfaces, the service levels of the subscribers (e.g., gold, silver, bronze or other designation indicative of the service level promised to the subscriber), SLAs with service providers associated with one or more sub-interfaces 106, or other suitable factors. In one embodiment, the bandwidth of the NIC TX interface 104B may be divided equally among the sub-interfaces 106, though in other embodiments, particular sub-interfaces may receive more bandwidth allocation than other sub-interfaces.

Depending upon the workload, a sub-interface 106 may be either pinned to a separate CPU core or can coexist with another sub-interface on the same CPU core. For example, in the embodiment depicted, sub-interface 0 is executed by core_5, sub-interface 3 is executed by core_7, and sub-interfaces 1 and 2 are executed by core_6. In some embodiments, each sub-interface 106 may execute on a dedicated core. In other embodiments, multiple sub-interfaces 106 may be executed by each core.

Each sub-interface 106 has a number of tx_rings 110 that each comprise a queue to specify packets scheduled by the respective HQoS manager 108 to be transmitted by the NIC TX interface 104B. In some embodiments, each tx_ring 110 may be a queue of packet descriptors, wherein each packet descriptor includes a pointer to a location in memory of the host system 102 in which the packet (and optionally associated metadata) is stored and/or any other suitable information identifying the packet (e.g., the length of the packet). In various embodiments, any suitable memory of the host system 102 may be used to store the packets to be transmitted or the tx_rings 110. In some embodiments, the memory in which the tx_rings 110 are stored are memory mapped input/output (MMIO) regions that are dedicated for use by the NIC 104.

The number of tx_rings 110 associated with a sub-interface 106 depends upon the number of traffic classes used in the HQoS traffic management by the HQoS manager 108. In one embodiment, there is a one-to-one mapping between the tx_rings 110 and the traffic classes. Thus, a sub-interface 106 includes a tx_ring 110 for each different traffic class of packets managed by the sub-interface (and each tx_ring 110 is dedicated to a particular traffic class). Such an embodiment may offer flexibility to apply another level of traffic management over the packets of different traffic classes aggregated from sub-interfaces by leveraging the available resources on the NIC (e.g., the NIC may implement additional HQoS management, such as a hardware or software instance of an HQoS manager similar to HQoS manager 108). Dedicated tx_rings 110 for each traffic class may also allow unused bandwidth of a particular traffic class (e.g., for packets from a group of subscribers) of a sub-interface 106 to be consumed by other groups of subscribers in the same traffic class (e.g., on other sub-interfaces 106). Also, each sub-interface 106 may easily identify the traffic class in case of congestion and adjust the rates at the sub-interface and subscriber levels accordingly (e.g., using the bandwidth profiles to be described in greater detail below).

With a distributed software HQoS scheduler implementation (in which multiple instances of HQoS managers 108 are run by one or more cores), each sub-interface 106 is guaranteed a fixed slice of the overall port bandwidth of the NIC TX interface 104B. This ensures that all packets selected for transmission by an HQoS manager 108 in accordance with this allocated bandwidth are guaranteed to be transmitted on the physical wire (through NIC TX interface 104B).

The host system 102 may be at any suitable location within a network. In one embodiment, the host system 102 may be located at an edge of a network. As just one example, the host system 102 may receive packets from one or more content service providers and send the packets towards consumers of the content service providers. As another example, the host system 102 may aggregate packets from multiple end users. As yet another example, the host system 102 may be a router node in the middle of a network.

Figure 2:
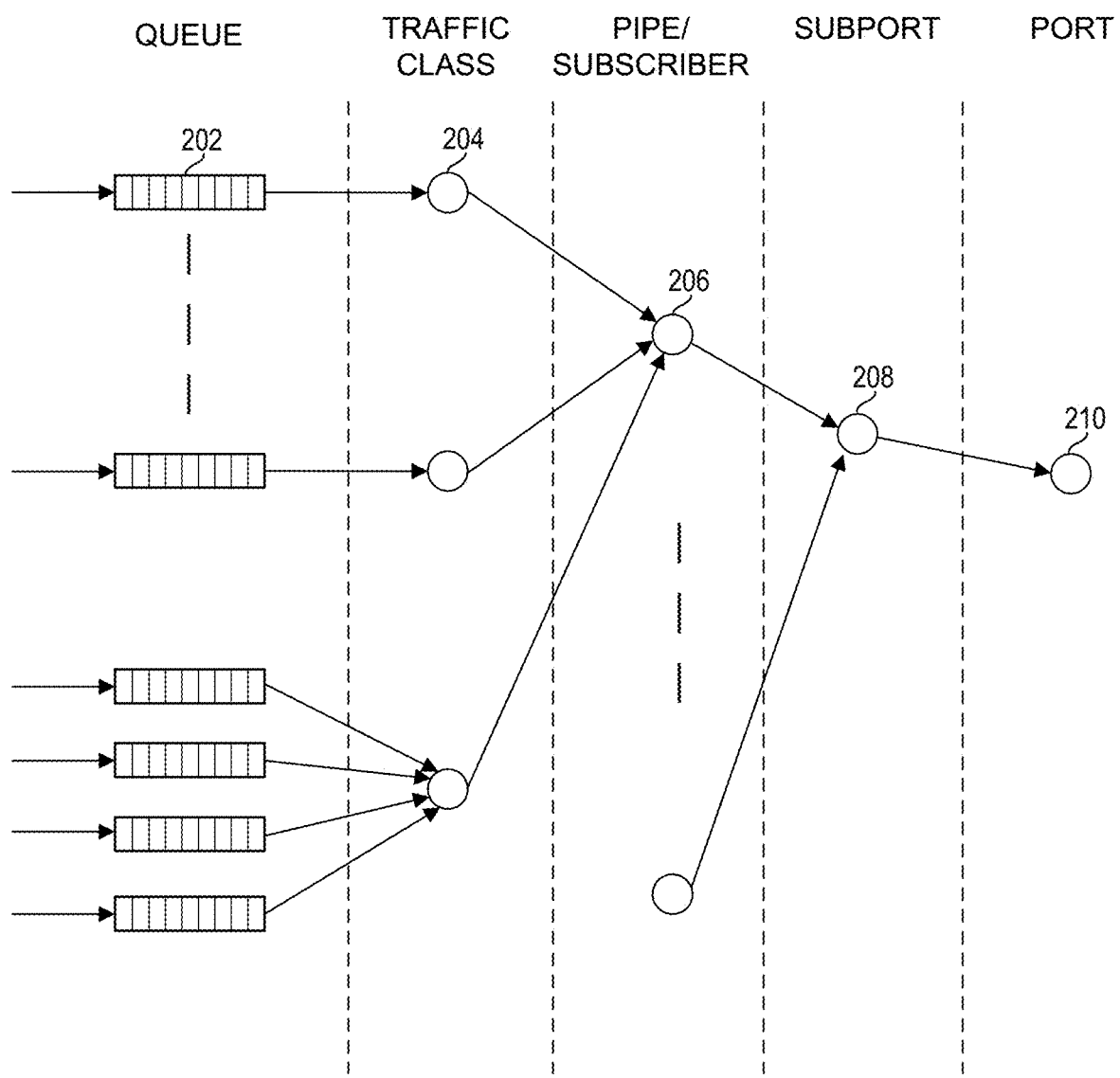
FIG. 2 illustrates a flow for assigning traffic to a port in accordance with certain embodiments.

FIG. 2 illustrates a flow for assigning traffic to a port 210 in accordance with certain embodiments. FIG. 2 depicts an example manner by which contents of multiple queues 202 are allocated for transmission from a port 210. When received from the NIC RX interface 104A, packets can initially be allocated to one or more queues 202. In one embodiment, each queue may host packets from one or more connections of the same type belonging to the same subscriber (e.g., user). Packets from queues can be assigned to a traffic class 204. A traffic class may represent a type of traffic with a set of unique transmission requirements (e.g., loss rate, delay, and jitter requirements). Multiple traffic classes can be allocated to a pipe 206 (which may in some embodiments represent traffic from a particular subscriber). Multiple pipes 206 can be allocated to a sub-port 208. Thus, a subport may represent a group of users. In some embodiments, a sub-port 208 might be allocated to a particular service provider for traffic from or to subscribers of that service provider. In various embodiments, a subport 208 may correspond to a sub-interface 106. Multiple sub-ports 208 can be allocated to an output port 210 for transmission from a network interface (e.g., NIC TX interface 104B) to a device, switch, router, end-point, or other network node through a network. In one embodiment, the port 210 may correspond to a physical egress port (e.g., an Ethernet TX port or other suitable physical port).

The HQoS manager 108 may implement any suitable QoS traffic manager hierarchy, such as the manager hierarchy from the Data Plane Development Kit (DPDK) sched library available at http://git.dpdk.org/dpdk/tree/lib/librte_sched?h=v19.08, or other suitable manager hierarchy (e.g., a manager hierarchy from OpenDataPlane). In one example, the manager hierarchy of the traffic manager 108 configured for a sub-interface 106 may contain one subport node 208 and multiple subscribers 206, where each subscriber may have packets of any number of traffic classes 204.

The HQoS manager 108 may prioritize transmission of packets from different subscribers (e.g., 206) and different traffic classes (e.g., 204) according to policies specified by the SLAs applicable to host system 102. Thus, the HQoS manager 108 may schedule packets of the sub-interface 106 based on various characteristics, such as classes of the traffic or subscription levels of the sender of the traffic (e.g., a particular subscriber may have an SLA that requires the system 100 to provide a high bandwidth or low latency for packets from that particular subscriber). In some embodiments, HQoS manager 108 may implement one or more of traffic shaping (e.g., for subport 208 and pipe 206 levels), strict priority (e.g., for traffic class 204 level), and weighted round robin (WRR) selection (e.g., for queues within each pipe traffic class). The scheduling capabilities of the HQoS manager 108 may allow the host system 102 to provide increased flexibility to satisfy traffic demands of various subscribers and service providers.

Figure 3:
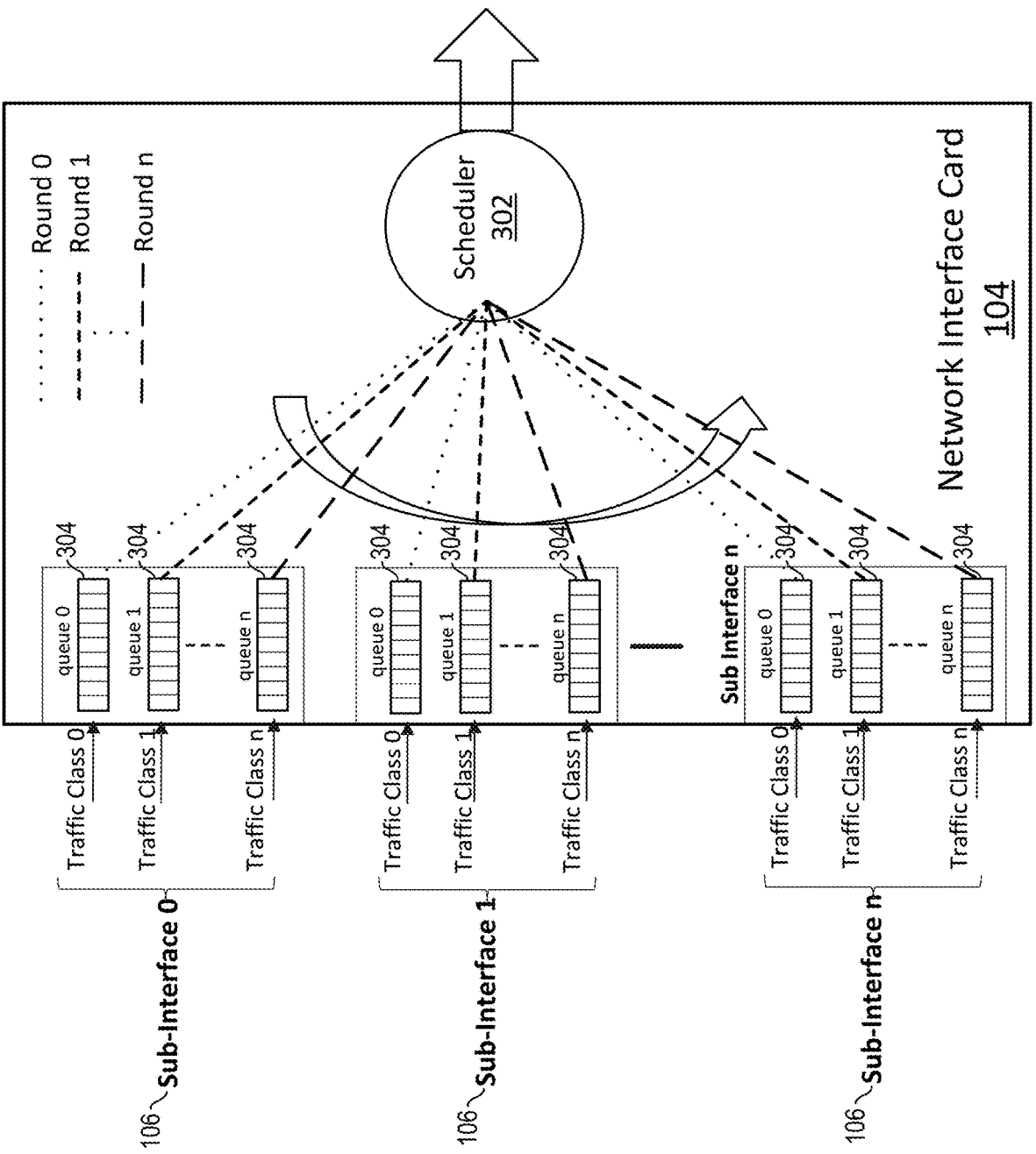
FIG. 3 illustrates a flow for scheduling traffic in accordance with certain embodiments.

FIG. 3 illustrates a flow for scheduling traffic in accordance with certain embodiments. This flow illustrates how unused sub-interface bandwidth may be redistributed among one or more other sub-interfaces 106. The flow depicts NIC 104 comprising a scheduler 302 and various transmit queues 304 for packets to be transmitted by NIC 104. In various implementations, the queues 304 may be the tx_rings 110 or some other queue including the packets or descriptors thereof. In the depicted embodiment, each queue 304 is dedicated to packets of a particular traffic class from a particular sub-interface 106. The scheduler 302 controls the order in which packets from the various queues 304 are transmitted by the NIC 104, and thus controls how much bandwidth is allocated to each sub-interface 106. In the embodiment depicted, the NIC 104 implements a strict priority scheme to schedule traffic received from sub-interfaces 106, wherein the packets from the highest priority traffic classes of all of the sub-interfaces are scheduled for transmission (e.g., as per the rates specified in one or more SLAs associated with subscribers or service providers) before starting the next round for lower priority traffic classes (although any suitable scheduling scheme is contemplated herein).

In a first round (round 0), the scheduler 302 causes all packets of traffic class 0 (from queue 0) of sub-interface 0 to be transmitted, then causes all packets of traffic class 0 (from queue 0) of sub-interface 1 to be transmitted, and so on. In other embodiments, the scheduler 302 could rotate between the sub-interfaces as it schedules transmission of the packets of traffic class 0 (corresponding to each queue 0) until all packets of traffic class 0 have been transmitted.

During a round of transmissions, the unused bandwidth of any sub-interface 106 may be redistributed to the same priority traffic class of one or more other sub-interfaces 106. Once a particular traffic class has been visited for all sub-interfaces 106, then the next round begins for the next traffic class (e.g., the traffic class that is immediately lower in priority than the previous traffic class) of the sub-interfaces 106. If a particular round has unused bandwidth after all sub-interfaces 106 have been visited, the unused bandwidth is carried over to the next round to ensure that any unused bandwidth in the higher priority traffic class is not lost, but can be used by traffic in another traffic class, thus improving utilization of the available bandwidth of the NIC 104.

In some embodiments, to ensure fairness among the sub-interfaces, when one cycle completes (e.g., all traffic classes of all of the sub-interfaces 106 have been visited or the available bandwidth for the entire cycle has been used up), the next cycle may start from a different sub-interface (e.g., the sub-interface 106 next to the sub-interface which went first in the previous cycle). For example, if sub-interface 0 was the first sub-interface to be visited during a first cycle, sub-interface 1 may be the first sub-interface visited during a second cycle. This will allow every sub-interface 106 to have a chance to benefit from unused bandwidth passed on to it from the previously visited sub-interfaces. In some embodiments, the order in which the sub-interfaces are visited may also be varied (e.g., the order could be randomly determined) between different rounds and/or cycles. For example, sub-interface 1 could follow sub-interface 0 in a first cycle or round, but then follow sub-interface n in a different cycle or round.

The unused bandwidth may be redistributed in any suitable manner. For example, the unused bandwidth could be split among any sub-interfaces that have not yet been visited during the round pro-rata according to the initial bandwidth allocated to each sub-interface 106. For example, if 100G of bandwidth is split among three sub-interfaces unevenly (e.g., 25G to a first sub-interface, 30G to a second sub-interface, and 45G to a third sub-interface), then if the first sub-interface has 10G of unused bandwidth after a first round, then the second sub-interface may receive 4G of the unused bandwidth and the third sub-interface may receive 6G of the unused bandwidth, as the second sub-interface was initially allocated 40% and the third sub-interface 60% of the total initial bandwidth allotted to the second and third sub-interfaces. In another example, the unused amount could be added to the amount available to the next sub-interface (and could continue to rollover along with any additional unused bandwidth to each successive sub-interface if not utilized). In some embodiments the bandwidth may be redistributed based on past bandwidth usage of the sub-interfaces (e.g., bandwidth may be distributed in proportion to bandwidth consumed by each sub-interface in the past). Any suitable redistribution of available bandwidth among the sub-interfaces 106 is contemplated herein.

In another embodiment, the bandwidth of a sub-interface that is unused for a particular traffic class may be used by the sub-interface for a lower priority traffic class. If the sub-interface has additional bandwidth remaining unused after all traffic classes of the sub-interface have been visited, that bandwidth may be reallocated to one or more other sub-interfaces.

Figure 4:
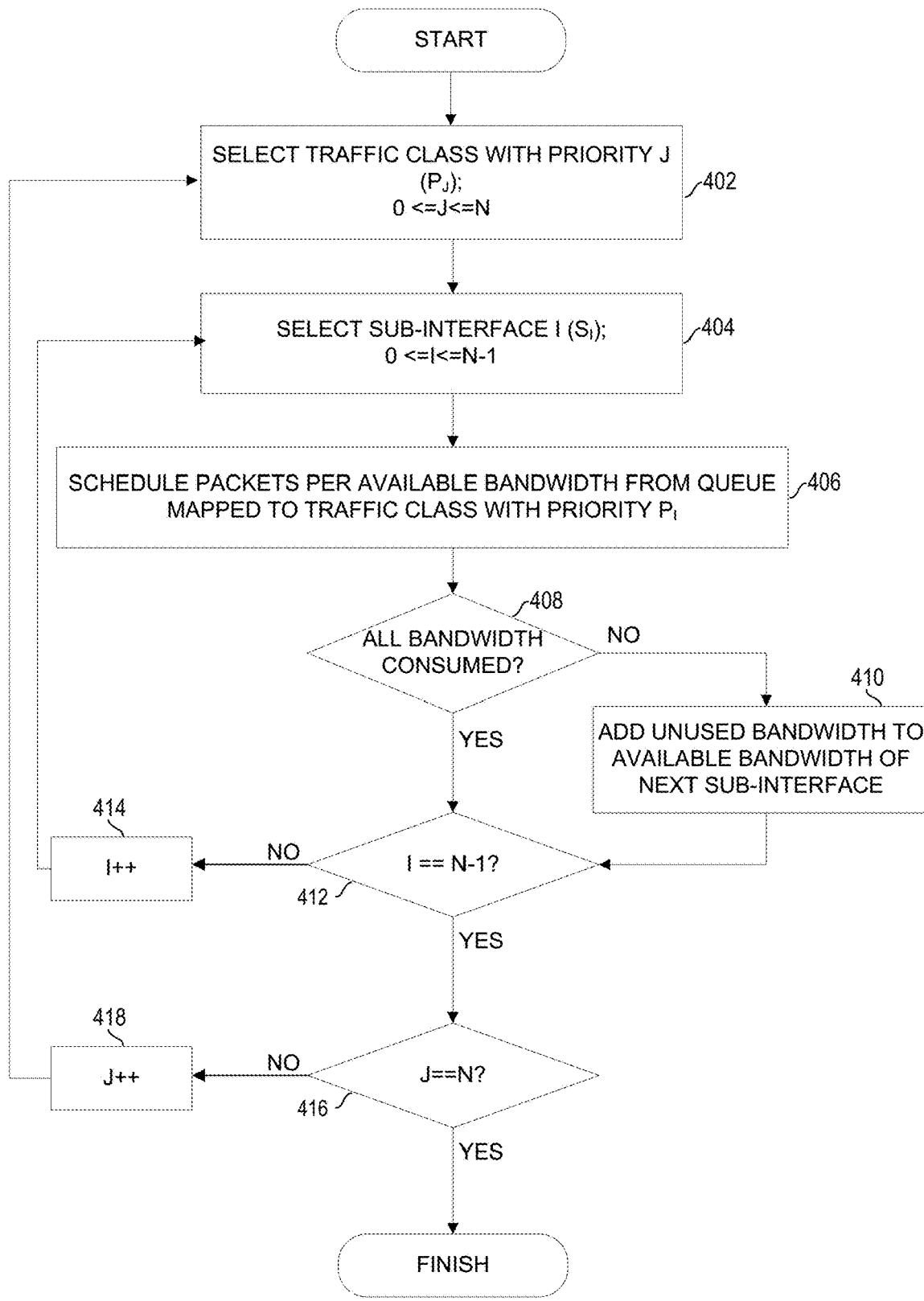
FIG. 4 illustrates a flow for reallocating unused bandwidth among sub-interfaces in accordance with certain embodiments.

FIG. 4 illustrates a flow for reallocating unused bandwidth among sub-interfaces 106 in accordance with certain embodiments. The flow may be implemented by any suitable logic of a NIC 104, e.g., scheduler 302.

At 402, a traffic class with priority J is selected. The selection may begin at the traffic class having the highest priority (e.g., J=0). With this nomenclature, the priority of the traffic class decreases with increasing priority number (thus J=N is the lowest priority traffic class). At 404, a sub-interface is selected. For example, a sub-interface 0 may be the first sub-interface selected in the embodiment depicted.

At 406, packets from the queue 304 mapped to the selected traffic class for the selected sub-interface 106 are scheduled according to the bandwidth available to the sub-interface 106. These packets are then transmitted by the NIC 104. At 408, a determination is made as to whether all of the bandwidth available to the selected sub-interface has been consumed. If it has not, then the unused bandwidth is added to the available bandwidth of the next sub-interface at 410.

At 412, a determination is made as to whether the sub-interface is the last interface. If it is not, then the flow moves to 414 where an iterator is incremented and then returns to 404 where the next sub-interface is selected and packets are scheduled for this sub-interface according to the available bandwidth. Any unused bandwidth continues to roll over for use by the next sub-interface 106. All of the sub-interfaces 106 may be cycled through for the selected traffic class. Once the last sub-interface has been visited, a determination as to whether the selected traffic class is the last traffic class is made at 416. If it is not, then an iterator is incremented at 418 and a new traffic class is selected at 402. The flow then operates in a similar manner to that described above with respect to the first traffic class. The flow finishes once the last traffic class has been visited (or earlier if all available bandwidth for the cycle has been utilized). The next cycle may then begin. In some embodiments, the order in which the sub-interfaces are visited may be different in the next cycle.

Figure 5:
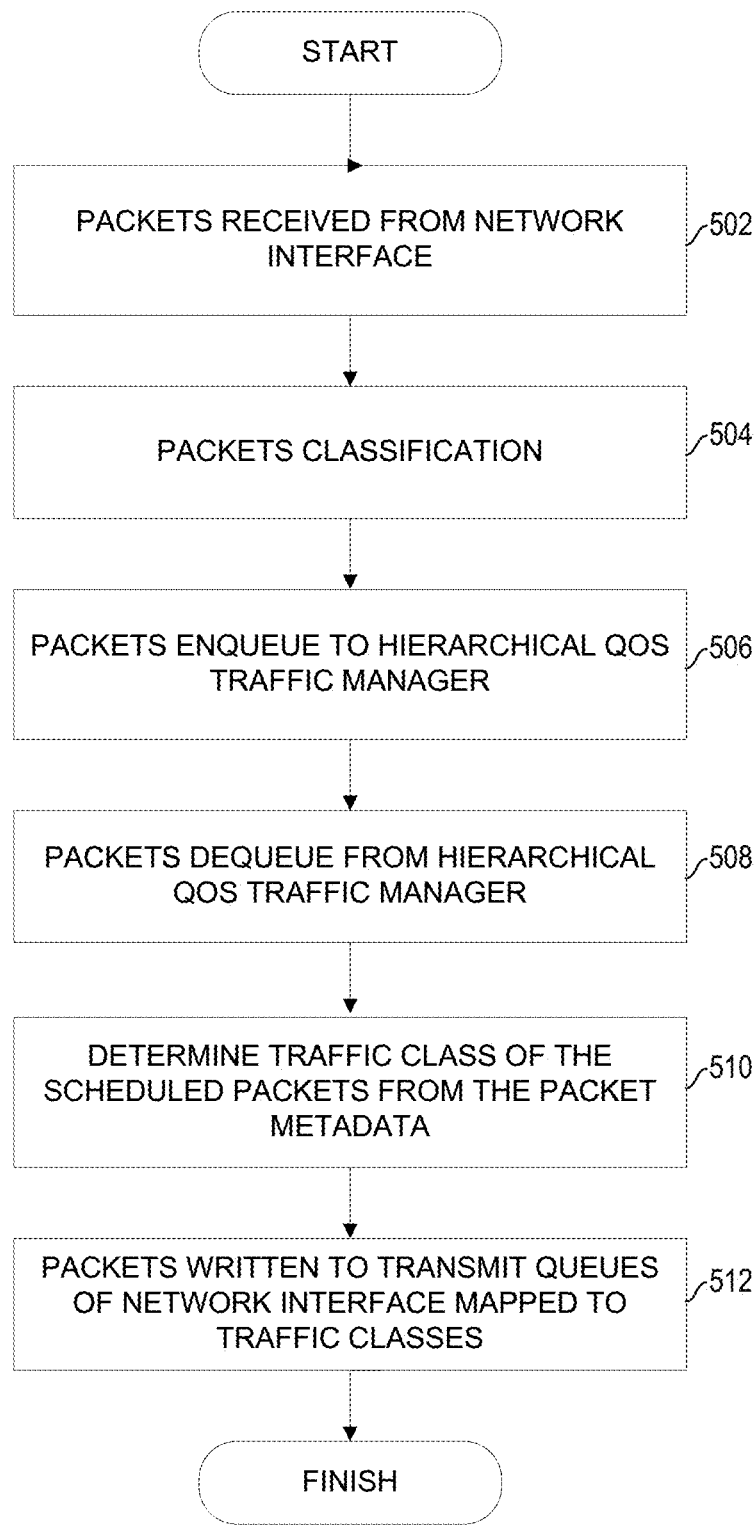
FIG. 5 illustrates a flow for managing traffic in accordance with certain embodiments.

FIG. 5 illustrates a flow for managing traffic in accordance with certain embodiments. At least some of the operations may be performed by a HQoS manager 108 of a sub-interface 106. Each HQoS manager 108 may facilitate the redistribution of unused bandwidth of NIC 104 among the subscribers assigned to its particular sub-interface 106 by the order in which the HQoS schedules packets for transmission to the NIC 104.

At 502, packets are received from network RX interface 104A. These packets may be the packets processed by the corresponding worker thread 112. At 504, the packets are classified. For example, packets received from the network interface 102 are classified by the HQoS manager 108 to determine the queue 202, traffic class 204, and pipe/subscriber 206 of the hierarchy. This allows the HQoS manager 108 to enforce SLAs at various levels of the hierarchy shown in FIG. 2. Alternatively, the packets could be classified by a worker thread 112 and metadata describing the results of the classification may be stored in association with the packets and accessed by the HQoS manager 108.

At 506, the HQoS manager 108 then enqueues the received packets to the appropriate traffic manager queues (not shown) of the HQoS manager 108 to begin the hierarchical scheduling of the packets based, e.g., on the traffic class and type of subscribers as per available bandwidth. The packets may remain in the traffic manager queues until they are scheduled by the HQoS manager 108, at which point a packet may then be dequeued from the traffic manager queue at 508.

At 510, the HQoS manager 108 determines the traffic class of the scheduled packets from packet metadata (e.g., metadata produced by the worker thread 112 or by the manager 108 itself). As just one example, the HQoS manager 108 may obtain this information from the sched field of the mbuf data structure when the aforementioned DPDK library is used.

At 512, the packets that were dequeued from the traffic manager queues are then written to transmit queues (e.g., tx_rings 110) mapped to the respective traffic classes of the packets. In some embodiments, packets may be written to transmit queues by writing descriptors of the packets to the appropriate tx_rings 110 of the sub-interface 106. The NIC 104 may then consume these packets for transmit. Accordingly, during a transfer of packets to the NIC 104, the destination NIC queues (e.g., tx_rings 110 within the MMIO space of the NIC 104) can be specified per packet (e.g., according to the traffic class of the packet) rather than per packet burst.

Figure 6:
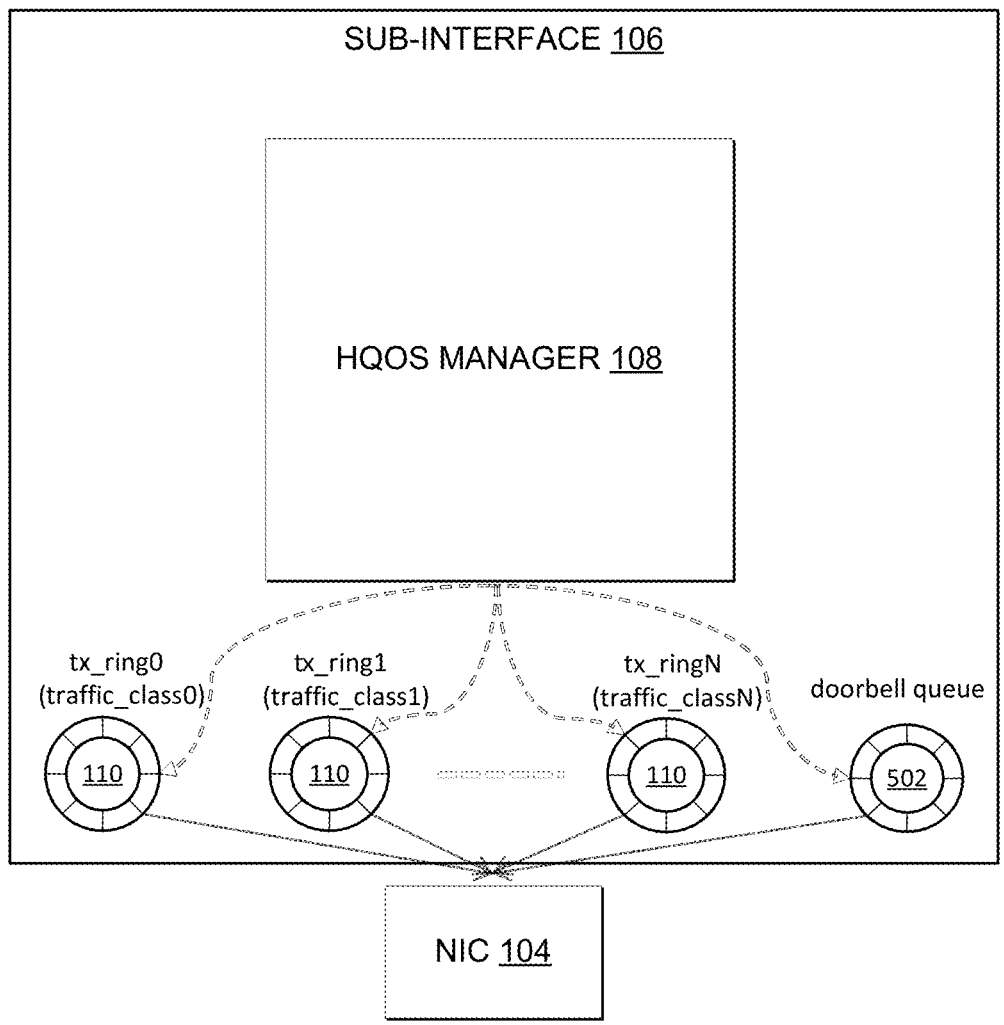
FIG. 6 illustrates a sub-interface with traffic rings in accordance with certain embodiments.

FIG. 6 illustrates a sub-interface 106 with tx_rings 110 and a doorbell queue 502 in accordance with certain embodiments. In some conventional implementations (e.g., ones that use the DPDK API), packets are transmitted to a NIC by specifying the transmit queue on which a burst of packets should be sent, and the underlying driver implementation writes the packet descriptors to a queue and then executes the queue's doorbell (e.g., notifies the NIC that packets are available in the queue). However, such an implementation may be sub-optimal when writing packets of a single burst to different transmit queues (e.g., tx_rings 110) individually, as this would utilize multiple doorbells (e.g., MMIO doorbells) per burst instead of performing a single MMIO write operation. To avoid multiple MMIO writes per burst, various embodiments utilize a doorbell management queue 502 which coalesces doorbells across multiple transmit queues (e.g., tx_rings 110). Once all the packets of the burst are written to transmit queues (e.g., tx_rings 110), the doorbell function is invoked to perform a single MMIO write. For example, a single descriptor which indicates the number of packet descriptors that were written to each tx_ring 110 for the burst may be written into the doorbell management queue 502. Various embodiments may maintain the behavior of one doorbell MMIO write per burst, but the write would be performed on the doorbell queue 502, rather than a single transmit queue. In one embodiment, all of the packet descriptors are first written to different transmit queues (e.g., 304) before the single descriptor is written to the doorbell management queue 502.

In various embodiments, an HQoS manager 108 may assign one of multiple bandwidth profiles (e.g., low, medium, and high bandwidth) to each traffic class of its sub-interface 106. In one embodiment, a bandwidth profile may specify a bandwidth for the traffic class for the sub-interface and corresponding bandwidths for the subscribers (e.g., 206) of the traffic hierarchy. The lowest bandwidth profile (e.g., low bandwidth) may be equal to the lowest bandwidth that provides the guaranteed bandwidth (e.g., via various SLAs) to the sub-interface's subscribers. During runtime, the bandwidth profile of the traffic-classes may be changed to a different profile (e.g., medium or high) depending upon the available bandwidth determined on the basis of the particular traffic class's tx_ring 110 occupancy when packet descriptors are being written to tx_rings 110. Low occupancy in a traffic class tx_ring 110 may indicate that the NIC 104 is transmitting packets at a relatively fast rate, and thus the sub-interface may utilize additional bandwidth and the bandwidth profile may be raised. Similarly, when NIC 104 transmits the packets at a slower rate, occupancy within the tx_ring 110 begins rising, indicating that the sub-interface 106 should reduce the over-subscribed bandwidth down to a lower bandwidth (e.g. the guaranteed bandwidth).

Figure 7:
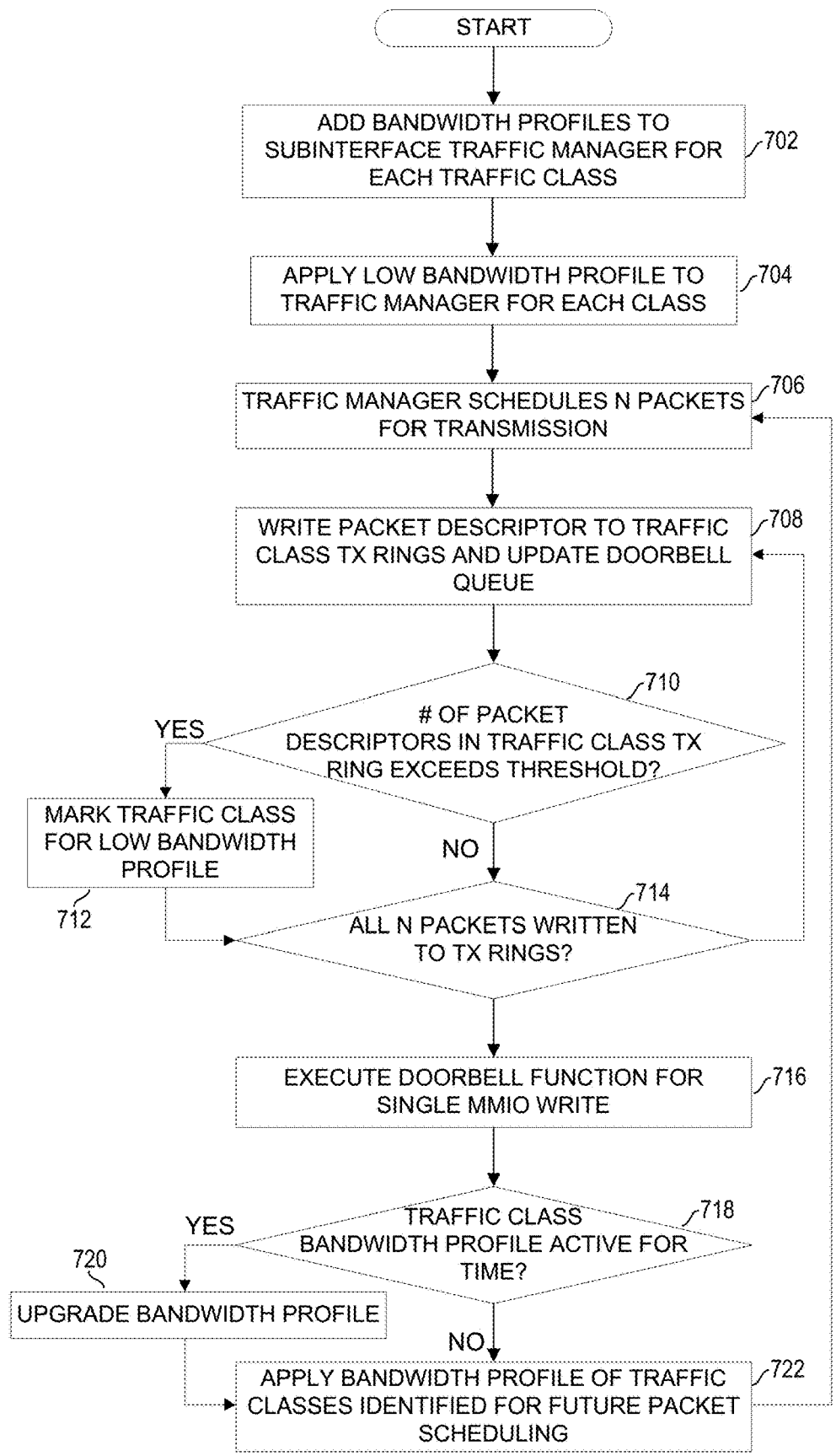
FIG. 7 illustrates a flow for applying bandwidth profiles to different traffic classes of the sub-interfaces in accordance with certain embodiments.

FIG. 7 illustrates a flow for applying bandwidth profiles to different traffic classes of the sub-interfaces in accordance with certain embodiments. This flow will focus on the operation of a particular sub-interface 106, although other sub-instances may operate similarly with respect to their respective tx_rings 110.

During an initialization phase, bandwidth profiles may be added to the HQoS manager 108 of the sub-interface at 702 (e.g., specification of the bandwidth profiles may be communicated to the HQoS manager 108). In one embodiment, three bandwidth profiles (e.g., low, medium, and high) are added to the HQoS manager 108 for a particular traffic class (though in other embodiments, any number of bandwidth profiles may be used). In some embodiments, the same bandwidth profiles may be used for each traffic class, while in other embodiments, the bandwidth profiles are unique for each traffic class. In various embodiments, each bandwidth profile may specify a traffic class rate for each traffic class of each subscriber, aggregate traffic rate of each subscriber, and traffic class rate for each traffic class at the sub-interface level aggregated over all of its subscribers. The HQoS manager 108 is to place traffic in the corresponding tx_ring 110 at rates corresponding to the specified bandwidths in the active bandwidth profile at the traffic class level for each subscriber, aggregated subscriber bandwidth rate for each subscriber, and the aggregated rate of each traffic class at the sub-interface. At 704, the lowest bandwidth profile (e.g., the low bandwidth profile specifying the minimum guaranteed rates) is applied for each class of traffic managed by HQoS manager 108.

At 706, the HQoS manager 108 schedules N packets (e.g., defining a burst of packets) for transmission by the NIC 104. At 708, the HQoS manager 108 writes packet descriptors to the tx_rings 110 of the appropriate traffic classes and updates the doorbell management queue 502 that coalesces doorbells across the multiple tx_rings 110 of a sub-interface 106 (e.g., by adding an entry to the doorbell queue 502 specifying which tx_ring entries are ready for consumption). At 710, a determination is made (e.g., by the HQoS manager 108) as to whether the number of packet descriptors present in a tx_ring 110 of a particular traffic class exceeds a threshold (where any suitable threshold, such as a particular % of the maximum occupancy of the tx_ring, may be used). In some embodiments, the thresholds may be the same for each traffic class or could be unique for each traffic class. Such a check may be made for each traffic class. If the corresponding threshold is exceeded, then the traffic class is marked for the low bandwidth profile at 712.

At 714, a check is made as to whether all N packets of the burst have been written to their corresponding tx_rings 110. Once all N packets have been written, a doorbell function for a single MMIO write is executed at 716. The NIC 104 may then access memory storing the packets (e.g., via a DMA transfer) and transmit the packets out through its transmit interface.

At 718, a determination is made as to whether a bandwidth profile for a traffic class has been active for a set amount of time. This determination may be made for any number of traffic classes. If a profile has been active for the amount of time (thus indicating that the threshold has not been exceeded for a particular amount of time), then the profile is upgraded at 720. For example, the profile may be upgraded one step (e.g., from low to medium or from medium to high). In various embodiments, the same time or different active times may be required between level upgrades (for example a first upgrade may require a first amount of time and a second upgrade may require a different amount of time). In other embodiments, the profile could be upgraded based on any suitable other criteria. For example, the occupancy of each tx_ring 110 over a single point or multiple points in time may be examined to determine whether to upgrade the bandwidth profile for one or more traffic classes. As one example, if any traffic class tx_ring 110 occupancy is below a threshold mark for a certain time period, then its bandwidth profile can be safely upgraded. At 722, the determined bandwidth profiles of the traffic classes are applied for future packet scheduling and the flow continues with the next burst of N packets at 706.

Figure 8:
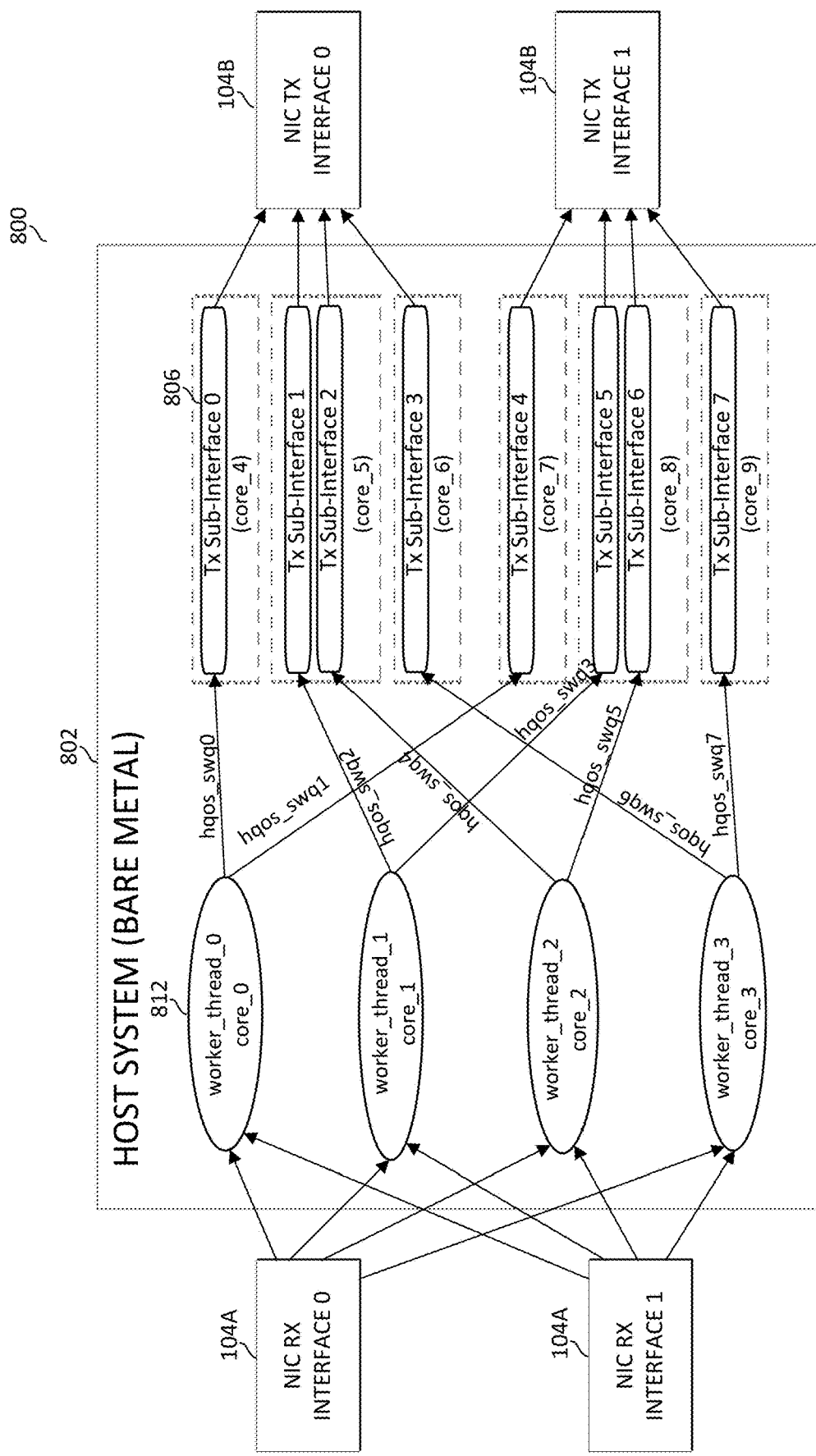
FIG. 8 illustrates a system for managing traffic from multiple network interface controllers in accordance with certain embodiments.

FIG. 8 illustrates a system 800 for managing traffic using multiple NICs 104 in accordance with certain embodiments. The system 800 may have any suitable characteristics described above with respect to system 100. In this embodiment, each worker thread 812 receives packets from each of multiple NIC RX interfaces 802. The worker thread 812 may process the packets and then forward the packets to sub-interfaces 806 (which may have any suitable characteristics of sub-interfaces 106). A portion of the sub-interfaces 806 may send packets out exclusively through a first NIC TX interface 0 and the remaining sub-interfaces 806 may send packets out exclusively through a second NIC TX interface 1 (e.g., using any of the techniques described herein). Although not shown, each sub-interface 806 may include a HQoS manager 108. Each NIC TX interface 104B may implement a bandwidth allocation scheme such as described above among its respective sub-interfaces 806.

Figure 9:
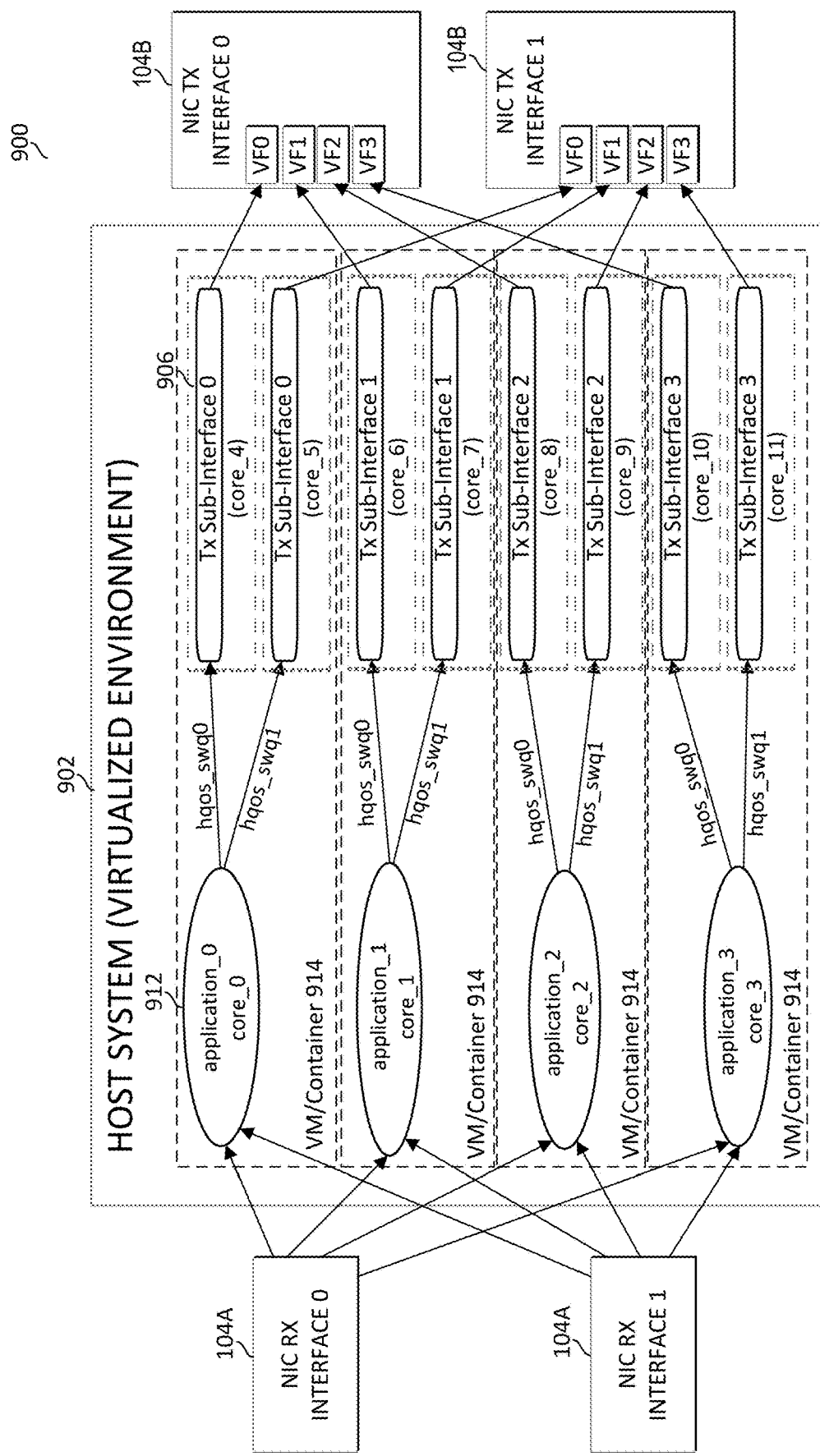
FIG. 9 illustrates a virtualized system for managing traffic from multiple network interface controllers in accordance with certain embodiments.

FIG. 9 illustrates a virtualized system 900 for managing traffic using multiple network interface controllers in accordance with certain embodiments. The configuration of FIG. 9 is similar to the configuration of FIG. 8, except that instead of having no boundaries between the worker threads and the sub-interfaces, in FIG. 9, an application 912 (which may perform the same functions as the worker threads previously discussed) and its associated sub-interface(s) 906 are included within the same virtual machine or container 914 (or other virtual entity). Also, the packets on each sub-interface 906 are transmitted to a respective virtual function (VF) of a NIC TX interface 104B. As depicted, each VM/container 914 may include interfaces coupled to multiple different physical NIC TX interfaces. For example, the topmost VM/container 914 includes a first TX sub-interface 0 that sends packets to VF0 of NIC TX interface 0 and a second TX sub-interface 0 that sends packets to VF0 of NIC TX interface 1.

In various embodiments, when VMs or containers are used to implement the sub-interfaces and/or applications, the VMs or containers may be managed by any suitable vitualization management software, such as a Docker engine, a Kubernetes engine, Amazon Web Services Firecracker, or other VMM, container engine, or other virtualization management software.

In some embodiments, the virtual functions may be created (or the sub-interfaces and the NICs may otherwise interact) using Single Root I/O Virtualization (SR-IOV), Intel® Scalable I/O Virtualization, or other I/O virtualization functionality.

Figure 10:
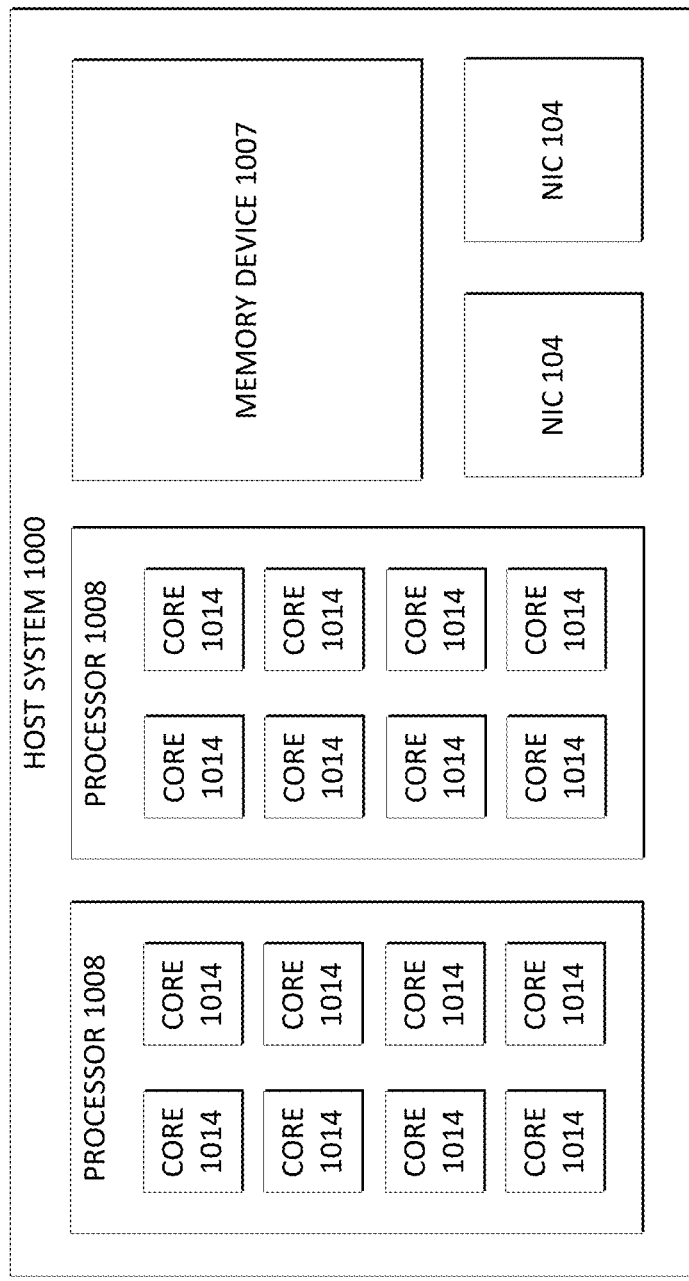
FIG. 10 illustrates a host computing system in accordance with certain embodiments.

FIG. 10 illustrates a host system 1000 in accordance with certain embodiments. The host system (or other suitable computing system) may be used to implement any of the traffic management systems described herein (e.g., host system 100, 800, 900). Host system comprises multiple processors 1008 (although other implementations may include a single processor). The processor may be a microprocessor, an embedded processor, a digital signal processor (DSP), a network processor, a handheld processor, an application processor, a co-processor, an SOC, or other device to execute code (i.e., software instructions). Processor 1008, in the depicted embodiment, includes eight processing elements (e.g., cores 1014), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 1014 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

A processor unit as used herein may refer to any suitable processing element, such as a central processing unit, a processor core (e.g., 1014), central processing unit, a graphics processing unit, an accelerator, a field programmable gate array, a neural network processing unit, an artificial intelligence processing unit, an inference engine, a data processing unit, an infrastructure processing unit, or other suitable hardware element operable to perform computational functions.

Memory device 1007 may store any suitable data, such as data used by processor 1008 to provide the functionality of host system 1000. For example, data associated with programs that are executed or files accessed by cores 1014 may be stored in memory device 1007. Thus, a memory device 1007 may include a system memory that stores data and/or sequences of instructions that are executed or otherwise used by the cores 1014. In various embodiments, a memory device 1007 may store temporary data, persistent data (e.g., a user's files or instruction sequences) that remains stored even after power to the system memory device 1007 is removed, or a combination thereof. A memory device 1007 may be dedicated to a particular processor 1008 or shared with other devices (e.g., one or more other processors or other devices) of host system 1000.

In various embodiments, a memory device 1007 may include a memory comprising any number of memory arrays, a memory device controller, and other supporting logic (not shown). A memory array may include non-volatile memory and/or volatile memory. Non-volatile memory is a storage medium that does not require power to maintain the state of data stored by the medium, thus non-volatile memory may have a determinate state even if power is interrupted to the device. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bitlines and are individually addressable and in which bit storage is based on a change in bulk resistance.

Volatile memory is a storage medium that requires power to maintain the state of data stored by the medium (thus volatile memory is memory whose state (and therefore the data stored on it) is indeterminate if power is interrupted to the device). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

NICs 104 may be used to send and receive network traffic such as data packets. NICs may also be known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC 104 may enable communication between any suitable element of host system 1000 and another device coupled to the host system 1000 through a network. In various embodiments a NIC 104 may be integrated with a chipset of the host system 1000 (e.g., may be on the same integrated circuit or circuit board as the rest of the chipset logic) or may be on a different integrated circuit or circuit board that is electromechanically coupled to the chipset. In various embodiments, a NIC may include a communication interface, processing logic, memory, or other suitable components to facilitate its operations.

The flows described in the FIGs. herein are merely representative of operations that may occur in particular embodiments. In other embodiments, additional operations may be performed by the components of the various systems described herein. Various embodiments of the present disclosure contemplate any suitable signaling mechanisms for accomplishing the functions described herein. Some of the operations illustrated in the FIGs. may be repeated, combined, modified or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disk may be the machine readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGs. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various systems or components described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 may comprise a system comprising an interface to receive a plurality of packets; and a plurality of processor units to execute a plurality of transmission sub-interfaces, each transmission sub-interface to perform hierarchical quality of service (HQoS) scheduling on a distinct subset of the plurality of packets, wherein each transmission sub-interface is to schedule its subset of the plurality of packets for transmission by a network interface controller by assigning the packets of the subset to a plurality of transmission queues that each correspond to a distinct traffic class.

Example 2 may comprise the subject matter of Example 1, further comprising the network interface controller, wherein the network interface controller comprises a scheduler to allocate a transmission bandwidth of the network interface controller among each of the plurality of transmission sub-interfaces, such that each transmission sub-interface is guaranteed a minimum transmission bandwidth for each round of transmission by the network interface controller.

Example 3 may comprise the subject matter of any one of Examples 1-2, wherein the scheduler is to allocate at least a portion of unused transmission bandwidth of the first transmission sub-interface to a second transmission sub-interface for use during a transmission round.

Example 4 may comprise the subject matter of any one of Examples 1-3, wherein the scheduler is to modify an order of scheduling of the sub-interfaces in successive transmission rounds such that the same sub-interface is not scheduled to transmit first for two successive transmission rounds.

Example 5 may comprise the subject matter of any one of Examples 1-4, wherein, during a transmission cycle, the network interface controller is to transmit all available packets of a first traffic class from each sub-interface before transmitting any packets of a second traffic class.

Example 6 may comprise the subject matter of any one of Examples 1-5, wherein, during the transmission cycle, the scheduler is to allocate unused bandwidth associated with the first traffic class to at least one of the sub-interfaces for transmission of packets of the second traffic class.

Example 7 may comprise the subject matter of any one of Examples 1-6, wherein a first sub-interface of the plurality of sub-interfaces is to assign a bandwidth profile to a traffic class and to adjust the bandwidth profile of the traffic class based on occupancy of the transmission queue that corresponds to the traffic class.

Example 8 may comprise the subject matter of any one of Examples 1-7, wherein the first sub-interface is to initially assign a first bandwidth profile to the traffic class, wherein the first bandwidth profile specifies a bandwidth for the traffic class that is equal to a minimum required bandwidth for the traffic class.

Example 9 may comprise the subject matter of any one of Examples 1-8, wherein the first sub-interface is to assign a second bandwidth profile to the traffic class based on a determination that the first bandwidth profile has been active for the traffic class for a period of time, wherein the second bandwidth profile specifies a bandwidth for the traffic class that is greater than the minimum required bandwidth for the traffic class.

Example 10 may comprise the subject matter of any one of Examples 1-9, wherein the network interface controller is to retrieve packets from more than one of the plurality of transmission queues of a sub-interface in a single memory mapped input/output (I/O) operation responsive to a notification that packets are queued.

Example 11 may comprise a method comprising receiving a plurality of packets; and executing, by a plurality of processor units, a plurality of transmission sub-interfaces, each transmission sub-interface to perform hierarchical quality of service (HQoS) scheduling on a distinct subset of the plurality of packets, wherein each transmission sub-interface is to schedule its subset of the plurality of packets for transmission by a network interface controller by assigning the packets of the subset to a plurality of transmission queues that each correspond to a distinct traffic class.

Example 12 may comprise the subject matter of Example 11, further comprising allocating a transmission bandwidth of the network interface controller among each of the plurality of transmission sub-interfaces, such that each transmission sub-interface is guaranteed a minimum transmission bandwidth for each round of transmission by the network interface controller.

Example 13 may comprise the subject matter of any one of Examples 11-12, further comprising allocating at least a portion of unused transmission bandwidth of the first transmission sub-interface to a second transmission sub-interface for use during a transmission round.

Example 14 may comprise the subject matter of any one of Examples 11-13, further comprising transmitting during a transmission cycle, via the network interface controller, all available packets of a first traffic class from each sub-interface before transmitting any packets of a second traffic class.

Example 15 may comprise the subject matter of any one of Examples 11-14, further comprising assigning a bandwidth profile to a traffic class and adjusting the bandwidth profile of the traffic class based on occupancy of the transmission queue that corresponds to the traffic class.

Example 16 may comprise one or more non-transitory computer-readable media with code stored thereon, wherein the code is executable to cause a machine to process a plurality of received packets; and execute a plurality of transmission sub-interfaces, each transmission sub-interface to perform hierarchical quality of service (HQoS) scheduling on a distinct subset of the plurality of packets, wherein each transmission sub-interface is to schedule its subset of the plurality of packets for transmission by a network interface controller by assigning the packets of the subset to a plurality of transmission queues that each correspond to a distinct traffic class.

Example 17 may comprise the subject matter of Example 16, wherein the code is executable to cause the machine to allocate a transmission bandwidth of the network interface controller among each of the plurality of transmission sub-interfaces, such that each transmission sub-interface is guaranteed a minimum transmission bandwidth for each round of transmission by the network interface controller.

Example 18 may comprise the subject matter of any one of Examples 16-17, wherein the code is executable to cause the machine to detect that a first transmission sub-interface did not use all of its allocated transmission bandwidth during a transmission round; and allocate at least a portion of the unused transmission bandwidth of the first transmission sub-interface to a second transmission sub-interface for use during the transmission round.

Example 19 may comprise the subject matter of any one of Examples 16-18, wherein the code is executable to cause the machine to transmit during a transmission cycle, via the network interface controller, all available packets of a first traffic class from each sub-interface before transmitting any packets of a second traffic class.

Example 20 may comprise the subject matter of any one of Examples 16-19, wherein the code is executable to cause the machine to assign a bandwidth profile to a traffic class and adjust the bandwidth profile of the traffic class based on occupancy of the transmission queue that corresponds to the traffic class.

Example 21 may comprise one or more non-transitory computer-readable media with code stored thereon, wherein the code is executable to cause a machine to reallocate bandwidth reserved for a first group of at least one subscriber to transmit packets of a first traffic class during a transmission round, wherein the reallocating bandwidth comprises determining an unused amount of bandwidth reserved for the first group to transmit packets of the first class; and allocating at least a portion of the unused reserved bandwidth to a second group of at least one subscriber to transmit packets of the first traffic class during the transmission round.

What is claimed is:

1. A system comprising:
a plurality of processor units to execute a plurality of transmission sub-interfaces, each transmission sub-interface to perform hierarchical quality of service (HQoS) scheduling on a distinct subset of a plurality of packets, wherein each transmission sub-interface is to schedule its subset of the plurality of packets for transmission by a network interface controller by assigning the packets of the subset to a plurality of transmission queues that each correspond to a distinct traffic class;
wherein a first transmission sub-interface is to initially assign a first bandwidth profile to the traffic class corresponding to the first transmission queue, wherein the first bandwidth profile specifies a bandwidth for the traffic class that is equal to a minimum required bandwidth for the traffic class;
wherein the first transmission sub-interface is to assign a second bandwidth profile to the traffic class corresponding to the first transmission queue based on a determination that the first bandwidth profile has been active for the traffic class for a period of time, wherein the second bandwidth profile specifies a bandwidth for the traffic class that is greater than the minimum required bandwidth for the traffic class.

2. The system of claim 1, further comprising the network interface controller, wherein the network interface controller comprises a scheduler to allocate a transmission bandwidth of the network interface controller among each of the plurality of transmission sub-interfaces such that each transmission sub-interface is guaranteed a minimum transmission bandwidth for each round of packet transmission by the network interface controller.

3. The system of claim 2, wherein the scheduler is to:
allocate at least a portion of unused transmission bandwidth of the first transmission sub-interface to a second transmission sub-interface for use during a transmission round.

4. The system of claim 2, wherein the scheduler is to modify an order of scheduling of the transmission sub-interfaces in successive transmission rounds such that a transmission sub-interface is not scheduled to transmit first for two successive transmission rounds.

5. The system of claim 2, wherein, during a transmission cycle, the network interface controller is to transmit all available packets of a first traffic class having a highest priority from each transmission sub-interface before transmitting any packets of a second traffic class having a second highest priority.

6. The system of claim 5, wherein, during the transmission cycle, the scheduler is to allocate unused bandwidth associated with the first traffic class to at least one of the transmission sub-interfaces for transmission of packets of the second traffic class.

7. The system of claim 1, wherein the first transmission sub-interface is to increase a rate at which the first transmission sub-interface assigns packets to a first transmission queue based on a determination that an occupancy of the first transmission queue does not exceed a threshold.

8. The system of claim 2, wherein the network interface controller is to retrieve packets assigned to more than one of the plurality of transmission queues of a transmission sub-interface in a single memory mapped input/output (I/O) operation responsive to a notification that packets are queued.

9. A method comprising:
receiving a plurality of packets; and
executing, by a plurality of processor units, a plurality of transmission sub-interfaces, each transmission sub-interface to perform hierarchical quality of service (HQoS) scheduling on a distinct subset of the plurality of packets, wherein each transmission sub-interface is to schedule its subset of the plurality of packets for transmission by a network interface controller by assigning the packets of the subset to a plurality of transmission queues that each correspond to a distinct traffic class;
wherein a first transmission sub-interface is to initially assign a first bandwidth profile to the traffic class corresponding to the first transmission queue, wherein the first bandwidth profile specifies a bandwidth for the traffic class that is equal to a minimum required bandwidth for the traffic class;
wherein the first transmission sub-interface is to assign a second bandwidth profile to the traffic class corresponding to the first transmission queue based on a determination that the first bandwidth profile has been active for the traffic class for a period of time, wherein the second bandwidth profile specifies a bandwidth for the traffic class that is greater than the minimum required bandwidth for the traffic class.

10. The method of claim 9, further comprising allocating a transmission bandwidth of the network interface controller among each of the plurality of transmission sub-interfaces, such that each transmission sub-interface is guaranteed a minimum transmission bandwidth for each round of packet transmission by the network interface controller.

11. The method of claim 10, further comprising:
allocating at least a portion of unused transmission bandwidth of a first transmission sub-interface to a second transmission sub-interface for use during a transmission round.

12. The method of claim 10, further comprising transmitting during a transmission cycle, via the network interface controller, all available packets of a first traffic class from each sub-interface before transmitting any packets of a second traffic class.

13. The method of claim 9, further comprising assigning a bandwidth profile to a traffic class and adjusting the bandwidth profile of the traffic class based on occupancy of the transmission queue that corresponds to the traffic class.

14. One or more non-transitory computer-readable media with code stored thereon, wherein the code is executable to cause a machine to:
- process a plurality of received packets; and
- execute a plurality of transmission sub-interfaces, each transmission sub-interface to perform hierarchical quality of service (HQoS) scheduling on a distinct subset of the plurality of packets, wherein each transmission sub-interface is to schedule its subset of the plurality of packets for transmission by a network interface controller by assigning the packets of the subset to a plurality of transmission queues that each correspond to a distinct traffic class;
- wherein a first transmission sub-interface is to initially assign a first bandwidth profile to the traffic class corresponding to the first transmission queue, wherein the first bandwidth profile specifies a bandwidth for the traffic class that is equal to a minimum required bandwidth for the traffic class;
- wherein the first transmission sub-interface is to assign a second bandwidth profile to the traffic class corresponding to the first transmission queue based on a determination that the first bandwidth profile has been active for the traffic class for a period of time, wherein the second bandwidth profile specifies a bandwidth for the traffic class that is greater than the minimum required bandwidth for the traffic class.

15. The computer-readable media of claim 14, wherein the code is executable to cause the machine to allocate a transmission bandwidth of the network interface controller among each of the plurality of transmission sub-interfaces, such that each transmission sub-interface is guaranteed a minimum transmission bandwidth for each round of transmission by the network interface controller.

16. The computer-readable media of claim 15, wherein the code is executable to cause the machine to:
- detect that a first transmission sub-interface did not use all of its allocated transmission bandwidth during a transmission round; and
- allocate at least a portion of unused transmission bandwidth of the first transmission sub-interface to a second transmission sub-interface for use during the transmission round.

17. The computer-readable media of claim 15, wherein the code is executable to cause the machine to transmit during a transmission cycle, via the network interface controller, all available packets of a first traffic class from each sub-interface before transmitting any packets of a second traffic class.

18. The computer-readable media of claim 14, wherein the code is executable to cause the machine to assign a bandwidth profile to a traffic class and adjust the bandwidth profile of the traffic class based on occupancy of the transmission queue that corresponds to the traffic class.

19. One or more non-transitory computer-readable media with code stored thereon, wherein the code is executable to cause a machine to:
- reallocate bandwidth reserved for a first group of at least one subscriber to transmit packets of a first traffic class during a transmission round, wherein the reallocating bandwidth comprises:
  - determining an unused amount of bandwidth reserved for the first group to transmit packets of the first class; and
  - allocating at least a portion of the unused reserved bandwidth to a second group of at least one subscriber to transmit packets of the first traffic class during the transmission round;
- execute a transmission sub-interface to schedule transmission of packets for the first group, wherein the transmission sub-interface is to adjust a rate at which the transmission sub-interface assigns packets to a transmission queue based on an occupancy of the transmission queue;
- wherein the transmission sub-interface is to initially assign a first bandwidth profile to a traffic class corresponding to a first transmission queue, wherein the first bandwidth profile specifies a bandwidth for the traffic class that is equal to a minimum required bandwidth for the traffic class;
- wherein the transmission sub-interface is to assign a second bandwidth profile to the traffic class corresponding to the first transmission queue based on a determination that the first bandwidth profile has been active for the traffic class for a period of time, wherein the second bandwidth profile specifies a bandwidth for the traffic class that is greater than the minimum required bandwidth for the traffic class.

* * * * *